United States Patent [19]

Oushiden et al.

[11] Patent Number: 4,650,317

[45] Date of Patent: Mar. 17, 1987

[54] IMAGE FORMING APPARATUS WITH A UNIDIRECTIONAL MAGNIFICATION FUNCTION

[75] Inventors: Hideshi Oushiden, Kawasaki; Seiso Takemoto, Yokohama, both of Japan

[73] Assignee: Kabushiki Kaisha Toshiba, Kawasaki, Japan

[21] Appl. No.: 824,583

[22] Filed: Jan. 23, 1986

[30] Foreign Application Priority Data

Jan. 28, 1985 [JP] Japan .................................. 60-13746

[51] Int. Cl.[4] ...................... G03B 27/34; G03B 27/40; G03B 27/70

[52] U.S. Cl. .......................................... 355/57; 355/8; 355/52

[58] Field of Search ..................... 355/8, 11, 51, 52, 57

[56] References Cited

U.S. PATENT DOCUMENTS

| | | | |
|---|---|---|---|
| 3,861,797 | 1/1975 | Nishida et al. | 355/52 |
| 4,536,084 | 8/1985 | Tokuhara | 355/57 X |
| 4,571,061 | 2/1986 | Osanai et al. | 355/57 X |
| 4,583,846 | 4/1986 | Nakamura et al. | 355/57 X |

*Primary Examiner*—Richard A. Wintercorn
*Attorney, Agent, or Firm*—Oblon, Fisher, Spivak, McClelland & Maier

[57] ABSTRACT

An image forming apparatus with a unidirectional magnification function, the apparatus comprising an original scanning unit for optically scanning an original in a predetermined direction so as to obtain an optical image, a variable magnification unit having first and second variable magnification mechanisms which vary magnifications of the optical image obtained by the original scanning unit in the original scanning direction, and in a direction perpendicular thereto, a photosensitive body which is movable in synchronism with the original scanning unit, an image forming unit for exposing the optical image onto the photosensitive body through the first or second variable magnification mechanisms of the variable magnification unit, so as to form an image which has the predetermined magnifications with respect to the original, and a unidirectional magnification unit for independently driving one of the first and second variable magnification mechanisms of the variable magnification unit.

4 Claims, 10 Drawing Figures

IMAGE FORMING APPARATUS WITH A UNIDIRECTIONAL MAGNIFICATION FUNCTION

BACKGROUND OF THE INVENTION

This invention relates to an image forming apparatus with a unidirectional magnification function and, more particularly, to an image forming apparatus suitable for an electronic copying machine, comprising a variable magnification function which allows desirable reduction or enlargement of an image in size, and a unidirectional magnification function, in which an original image can be freely reduced or enlarged in size only in one direction.

In recent years, various electronic copying machines have been developed which comprise a variable magnification function that enables desired reduction or enlargement of an image in size. Operating principles of such a copying machine with a stationary original table will be described briefly.

An original placed on an original table is scanned by a scanning section comprising an exposure lamp and a mirror. The reflected light from the original is radiated through a plurality of mirrors and lenses onto a rotating photosensitive drum which is uniformly precharged. Thus, an electrostatic latent image is formed on the drum. The latent image is developed with toner, and the toner image is transferred to a paper sheet, thus completing one copying cycle.

In this case, the size of a copied image in a scanning direction of the original is determined by a ratio of scanning speed to a rotating speed of the photosensitive drum (to be referred to as a speed rate hereinafter). The size of the copied image in a direction perpendicular to the scanning direction is determined by a ratio of an optical path length from the original to a predetermined lens for guiding the reflected light on to the photosensitive drum, to an optical path length from the predetermined lens to the photosensitive drum (to be referred to as an optical path length ratio). Therefore, when the speed ratio and the optical path length ratio are changed, reduction or enlargement magnification for copying can be freely set with respect to an original image.

In the conventional copying machine, however, magnification in the original scanning direction (to be referred to as longitudinal magnification) is equal to magnification in a direction perpendicular to the scanning direction (to be referred to as lateral magnification), and one of these magnifications cannot be changed independently. For this reason, it is impossible to obtain a copied image which is reduced or enlarged in only the longitudinal or lateral direction of the original during an actual copying operation.

Another cônventional copying machine has been proposed wherein, when optical system lenses are replaced with accessory unidirectional magnification lenses, a copied image which is reduced in size at different magnifications in the longitidinal and lateral directions can be formed. With this copying machine, however, lenses must be changed every time such an image is to be formed, resulting in inconvenience to a use. In addition, the copying operation is only enabled for fixed magnifications. Furthermore, a copied image which is reduced or enlarged in size in only one direction of the original cannot be obtained. Since a user must repeatedly change the lenses, they can easily be damaged.

SUMMARY OF THE INVENTION

It is, therefore, an object of the present invention to provide a new and improved image forming apparatus with a unidirectional magnification function which can easily form an image, reduced or enlarged in size in one direction of an original, without changing lenses.

According to the present invention, there is provided an image forming apparatus with a unidirectional magnification function, the apparatus comprising:

original scanning means for optically scanning an original in a predetermined direction so as to obtain an optical image;

variable magnification means having first and second variable magnification mechanisms which vary magnifications of the optical image, obtained by the original scanning means in the original scanning direction and a direction perpendicular thereto;

a photosensitive body which is movable in synchronism with the original scanning means;

image forming means for exposing the optical image onto the photosensitive body through the variable magnification means so as to form an image which has the predetermined magnfications with respect to the original thereon; and unidirectional magnification means for independently driving one of the first and second variable magnification mechanisms of the variable magnification means.

BRIEF DESCRIPTION OF THE DRAWINGS

These and other objects and features of the present invention can be understood by reference to the accompanying drawings, in which:

FIGS. 7A-1, 7A-2 and 7B-1, 7B-2 are flow charts for explaining the operation of the embodiment of the present invention.

DETAILED DESCRIPTION OF THE PREFERRED EMBODIMENT

An embodiment of the present invention will now be described with reference to the accompanying drawings.

Figure 1:
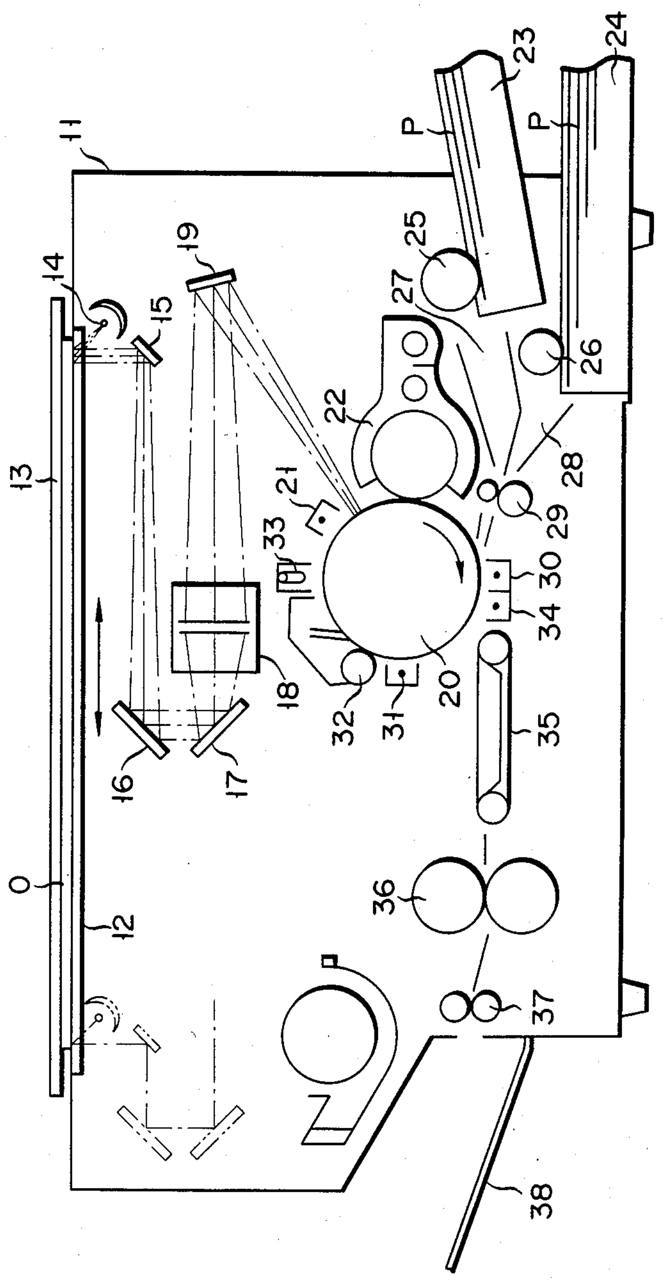
FIG. 1 is a cross-sectional front view schematically showing an image forming apparatus according to an embodiment of the present invention.

FIG. 1 shows a stationary original table type copying machine, having variable and unidirectional magnification functions as an image forming apparatus according to an embodiment of the present invention. Reference numeral 11 denotes a copying machine housing, on which original table 12 for supporting original O is mounted. Original cover 13 is axially supported on table 12 so that it can be freely opened and closed. Original O on table 12 is scanned with exposure lamp 14, in conjunction with mirrors 15, 16, and 17 along the lower surface of table 12 in directions indicated by the arrows in FIG. 1. Mirrors 16 and 17 move at a speed ½ that of mirror 15, so as to keep an optical path length constant. Light reflected from original O upon illumination of exposure lamp 14 is reflected by mirrors 15, 16, and 17, passes through lens 18, and is then reflected by mirror 19, thereby radiating photosensitive drum 20. Drum 20 is rotated in the direction indicated by the arrow in FIG. 1, and the surface thereof is charged by charger 21. The optical image of original O is then slit-exposed on drum 20 so as to form an electrostatic latent image thereon. The latent image is visualized with toner by developing unit 22.

Paper P is picked up one sheet at a time by paper feed roller 25 or 26 from upper or lower paper teed cassette 23 or 24. Cassettes 23 and 24 are detachably mounted on the lower right end portion of housing 11. Paper P is guided along paper guide path 27 or 28 to aligning rollers 29, and is then conveyed to a transfer unit (not shown). When paper P in the transfer unit is brought into contact with the surface of drum 20 at an area corresponding to transfer charger 30, the toner image on drum 20 is transferred onto paper P by charger 30. After the transfer operation, drum 20 is discharged by discharger 31, and residual toner on its surface is removed by cleaner 32. Finaly, an after image left on drum 20 is erased by discharging lamp 33, thereby returning drum 20 to the initial state.

After the transfer operation, paper P is electrostatically peeled from the surface of drum 20 by peeling charger 34, and is then conveyed along paper convey path 35 to heat rollers 36, which act as a fixing unit. After paper P is passed between rollers 36 so as to fix the transfer image thereon, it is dischanged by exit rollers 37 onto tray 38, which extends outward from housing 11.

In a reduction or enlargement copying mode, a desired copying magnification is set by a magnfication setting unit on a control panel (to be described later), thus varying the magnification of a variable magnification means. In accordance with the preset magnification, a ratio (speed ratio) of moving speed (scanning speed) of lamp 14 and mirror 15 to the rotating speed of drum 20 is changed so as to change a magnification in the scanning direction (longitudinal magnification). At the same time, when mirrors 16 and 17 and lens 18 are shifted, a ratio (optical path length ratio) of an optical path length from original O to lens 18 to an original path length from lens 18 to drum 20 is changed so as to change a magnification in a direction perpendicular to the scanning direction (lateral magnification). Thereby, a copied image at desired magnfications can be obtained.

Figure 2:
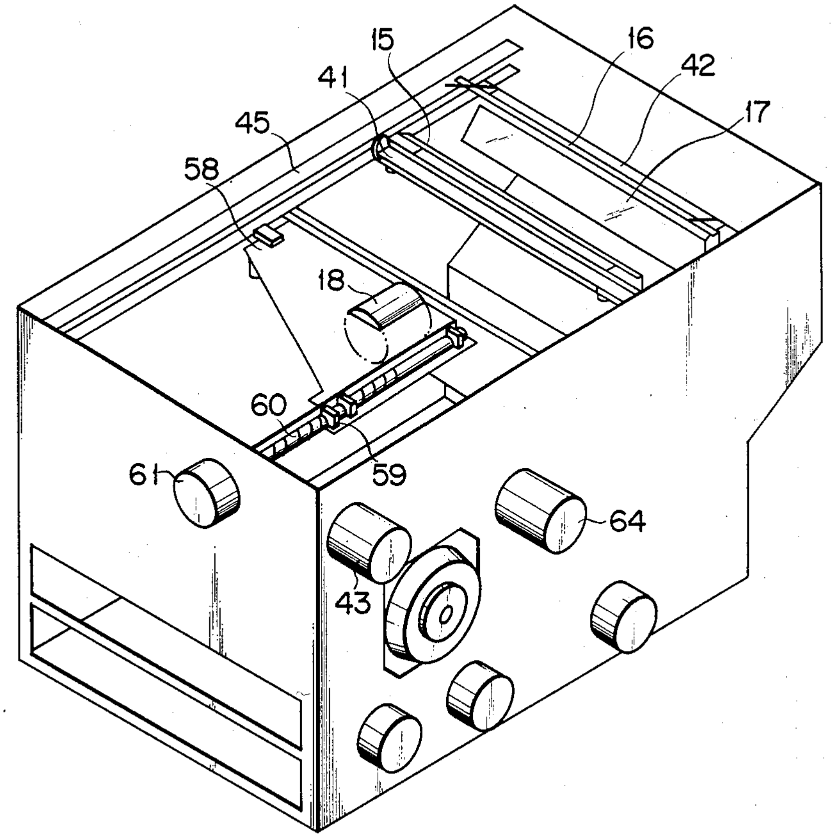
FIG. 2 is a perspective view showing a state wherein an original table is removed from the apparatus shown in FIG. 1.
Figure 3:
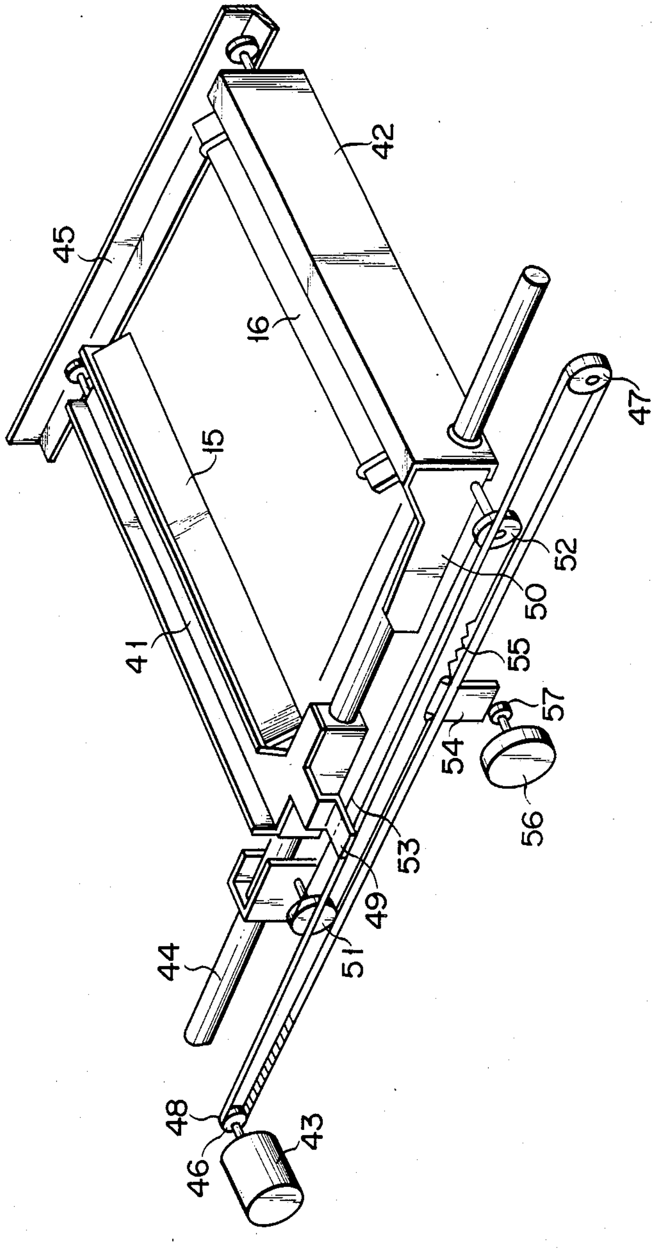
FIG. 3 is a side view showing a drive mechanism for an optical system in the apparatus of FIG. 1.

A mechanism for changing the speed ratio and optical path length ratio as the main feature of the present invention will now be described with reference to FIG. 2. FIG. 2 is a perspective view showing a state viewed from the back side of FIG. 1 wherein table 12 is removed from FIG. 1. Exposure lamp 14 and mirror 15, constituting a means for optically scanning original O, are mounted on first carriage 41. Mirrors 16 and 17 are mounted on second carriage 42. Second carriage 42 is driven by scanning motor 43 with a mechanism for moving it at a speed ½ that of first carriage 41. As shown in FIG. 3 in detail, first and second carriages 41 and 42 are guided by guide shaft 44 and guide rail 45 to reciprocate. Driving pulley 46, driven by scanning motor 43, is disposed at one end of guide shaft 44, and driven pulley 47 is disposed at the other end thereof. Endless toothed belt 48 is looped between pulleys 46 and 47, and a portion thereof is fixed to fixing portion 49, which extends from carriage 41.

Pulleys 51 and 52 are rotatably mounted on guide shaft supporting portion 50 of second carriage 42, to be separated at a predetermined distance in the axial direction of shaft 44. Wire 53 is looped between pulleys 51 and 52. One end of wire 53 is fixed directly to fixing member 54, and the other end is fixed thereto through coil spring 55. A portion of wire 53 is also fixed to fixing portion 49 of first carriage 41. Since pulleys 51 and 52 thus act as running blocks, second carriage 42 can be moved at a speed ½ that of first carriage 41. A rack (not shown) which is meshed with pinion 57 driven by mirror driving motor 56 is formed on the lower end face of fixing member 54. When motor 56 is driven, carriage 42 alone can be moved.

Figure 4:
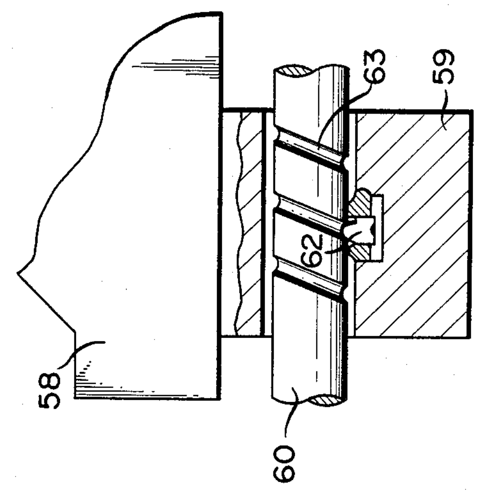
FIG. 4 is a side view showing a drive mechanism for a lens block of the apparatus in FIG. 1.

As shown in FIGS. 2 and 4, lens 18 is held by lens block 58. Lens block 58 has cam follower portion 59 fixed thereon and is thereby coupled to cam shaft 60. Cam shaft 60 is driven by lens driving motor 61. Lens block 58 is moved forward or backward in accordance with a rotating direction of motor 61. Second carriage 42 is moved in synchronism with block 58, and together, they constitute a means for changing the optical path length. FIG. 4 shows a state wherein cam follower portion 59 is coupled to cam shaft 60. When cam follower 62, engaged with portion 59, is moved along helical groove 63, lens block 58 is moved.

Finally, returning to FIG. 2, drum 20 is driven by special-purpose drum driving motor 64, separate from motors 43, 56, and 61. Motors 43, 56, 61, and 64 comprise stepping motors, and are independently controlled.

Figure 5:
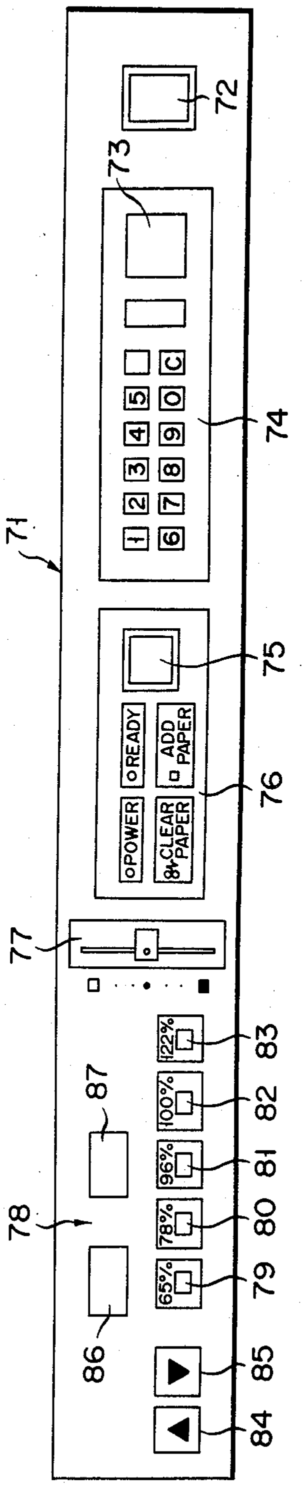
FIG. 5 is a plan view showing a control panel used in the embodiment of the present invention.

As shown in FIG. 5, control panel 71 is provided with power switch 72, copying key 73, ten keys 74 for setting a copying number, copying number display 75 for displaying the copying number, status display 76 for displaying an operating state, density setting unit 77 for setting a copying density, and magnification setting unit 78 for setting a copying magnification. Unit 78 comprises specific magnification keys 79 to 83 for selecting a plurality of specific magnifications (e.g., 65%, 78%, 96%, 100%, and 122%), a unidirectional magnification setting means for setting a unidirectional magnification, i.e., in this embodiment, magnification up and down keys 84 and 85 for increasing and decreasing the longitudinal magnification alone, and longitudinal and lateral magnification displays 86 and 87 for separately displaying preset longitudinal and lateral magnifications. In this embodiment, the magnification can be varied within the range of 100%±5% (100%=reference magnification) in view of an adverse influence on the copying machine. Every time key 84 (or 85) is depressed, the magnification is changed by 1%.

Figure 6:
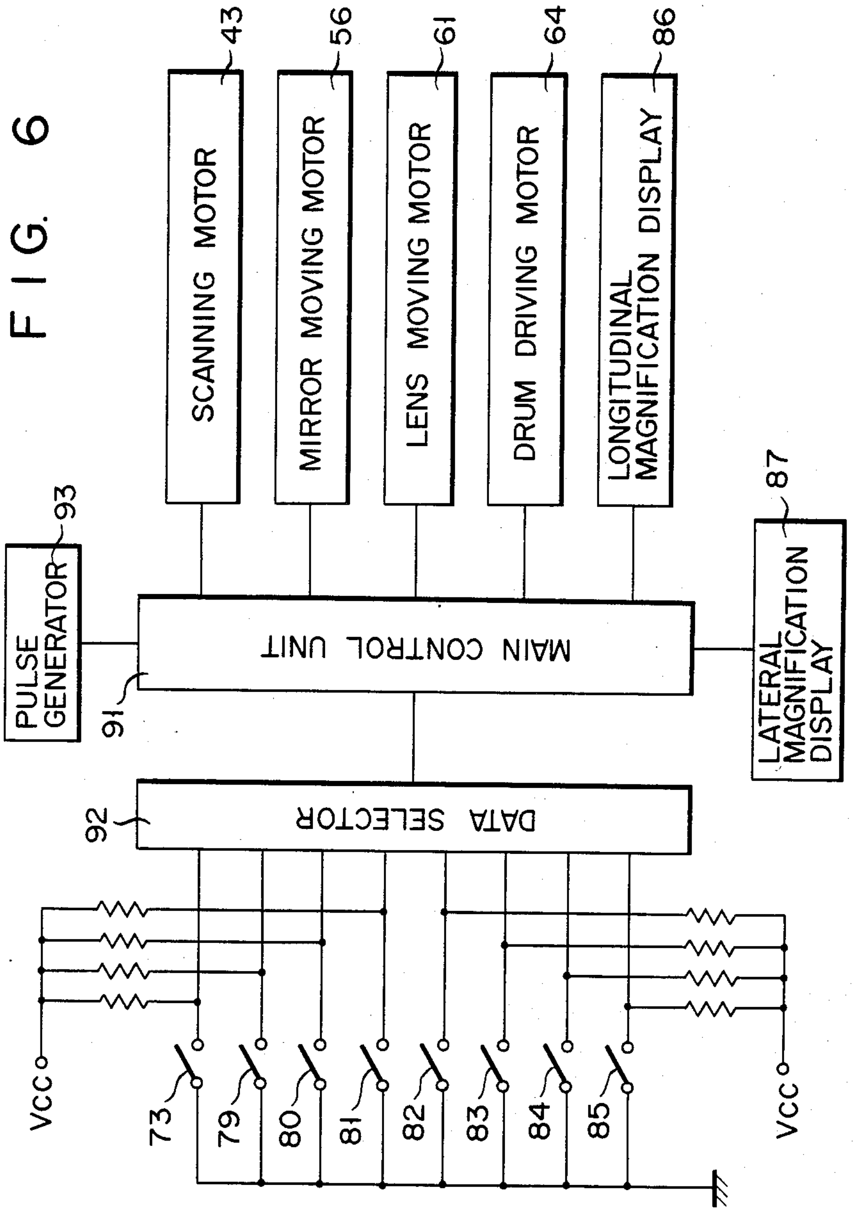
FIG. 6 is a schematic block diagram of a control unit used in the embodiment of the present invention.
Figures 1, 7A:
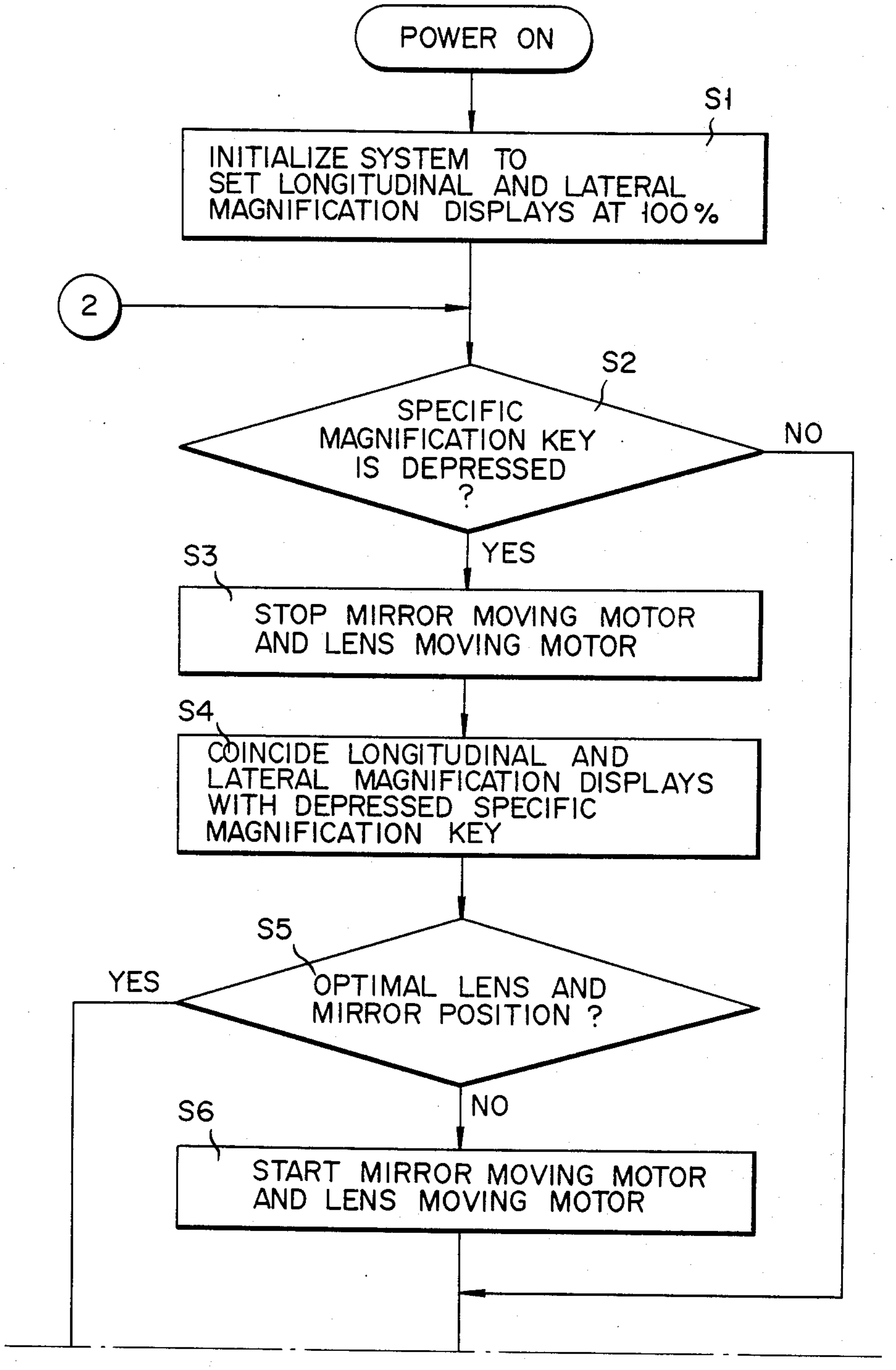
Figures 2, 7A:
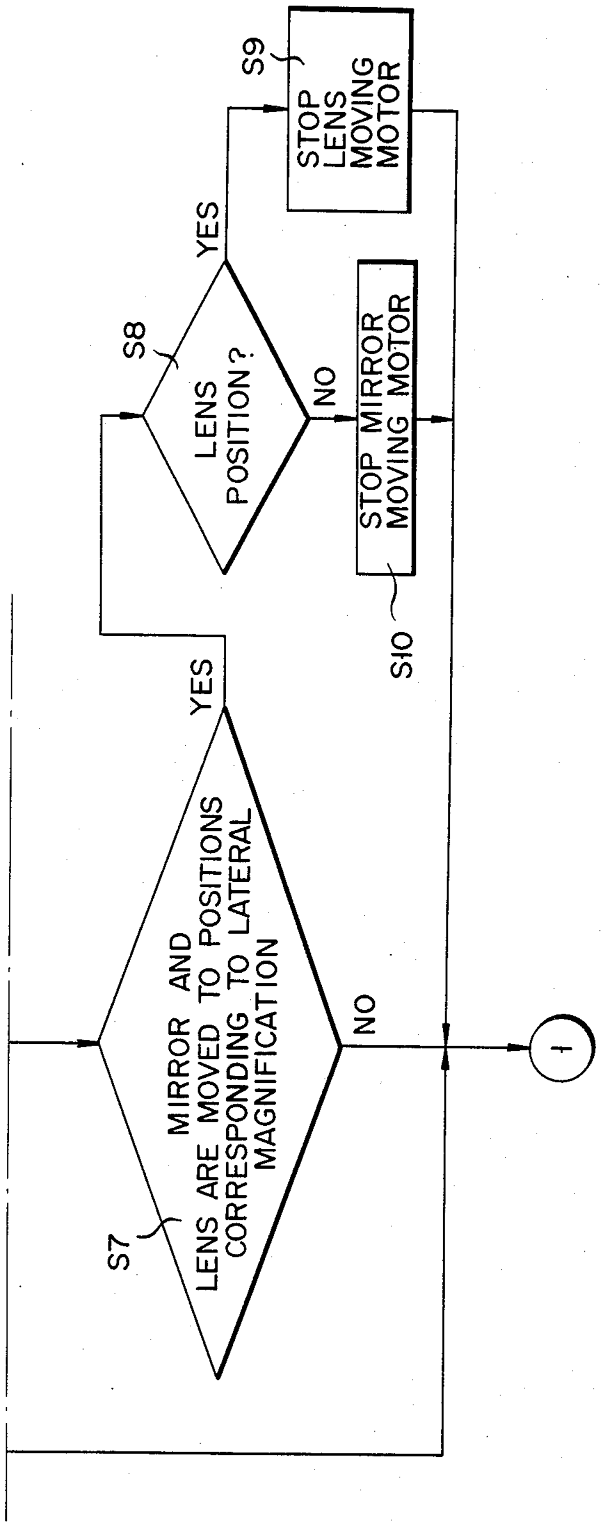
Figures 1, 7B:
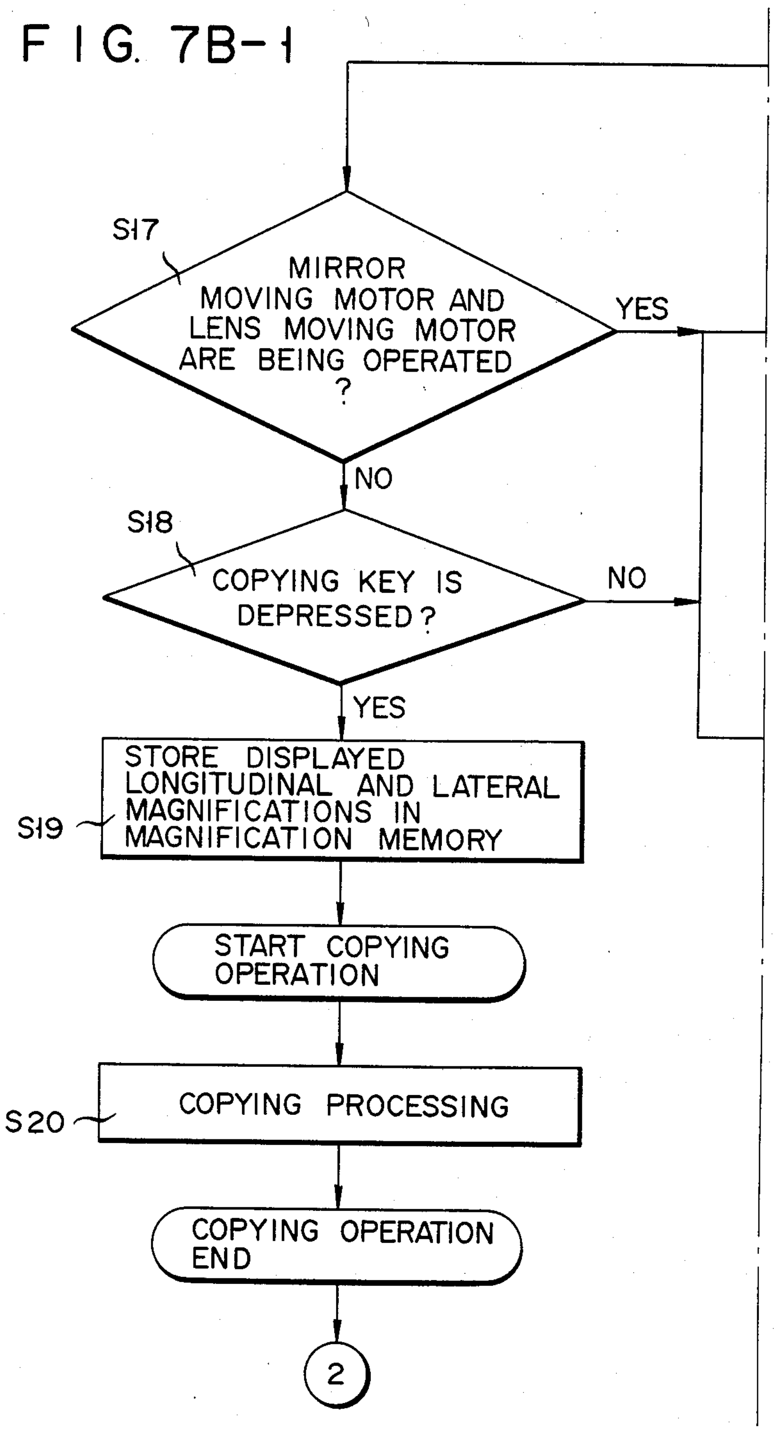
Figures 2, 7B:
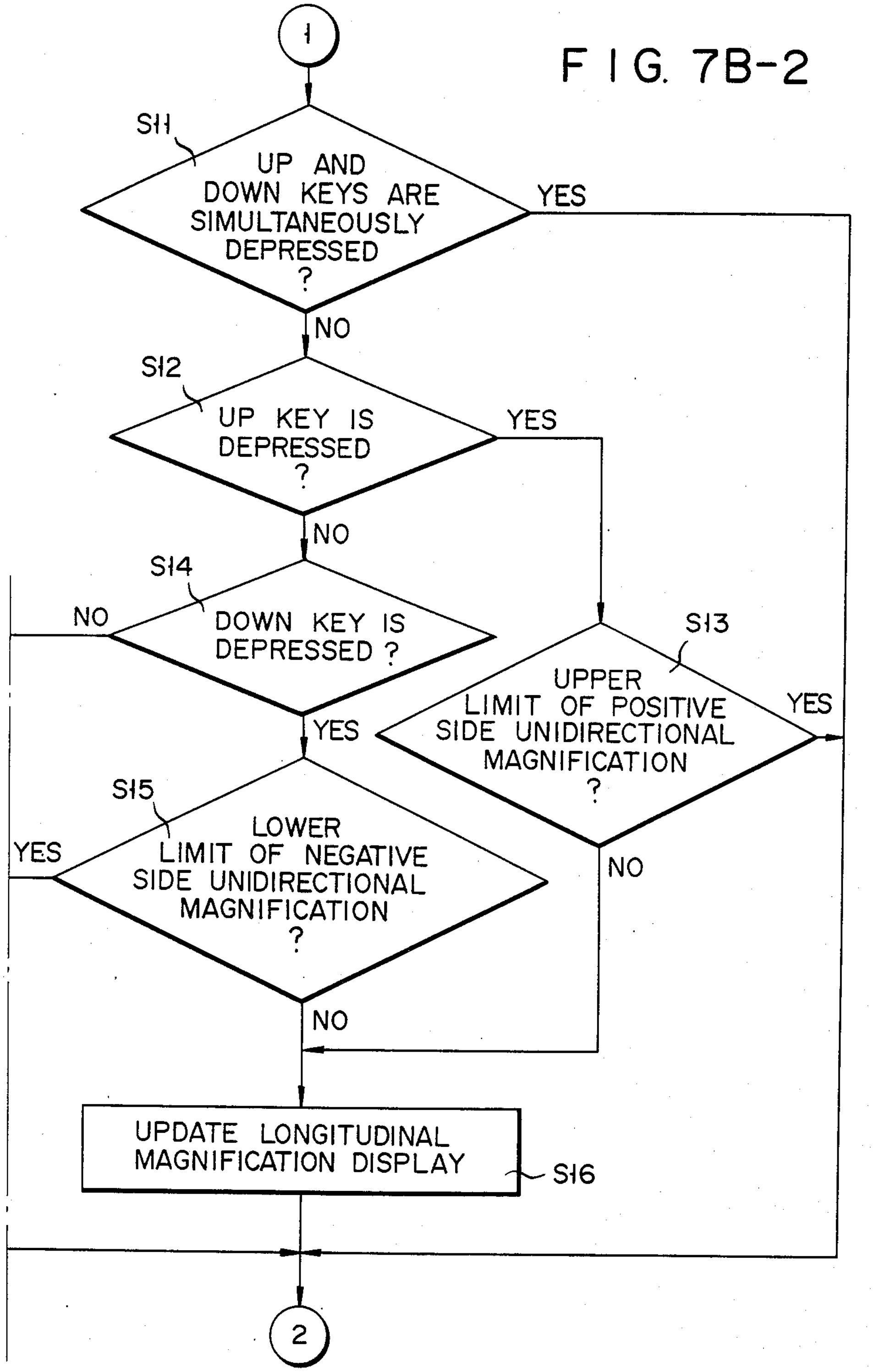

FIG. 6 shows the main part of a control unit of the present invention. Reference numeral 91 denotes a main processing unit, comprising a CPU (central processing unit) and its peripheral circuits, for controlling the overall copying machine. The input of unit 91 is connected through data selector 92 to copying key 73, specific magnification keys 79 to 83, and magnification up and down keys 84 and 85. The outputs of unit 91 are connected to motors 43, 56, and 61, and displays 86 and 87. Furthermore, unit 91 is connected to pulse generator 93 for generating clock pulses for driving the stepping motors and periodically sensing various switches on control panel 71. Unit 91 also periodically senses specific magnification keys 79 to 83, and magnification up and down keys 84 and 85 using clock pulses from generator 93. In addition, unit 91 updates indications on displays 86 and 87 and controls motors 56 and 61 in accordance with the detected result. When depression of copying key 73 is detected, unit 91 drives motors 43, 64, and the like, so as to start the copying operation.

The operation of the apparatus with the above arrangement will be described with reference to the flow charts shown in FIGS. 7A-1, 7A-2 and 7B-1, 7B-2. Upon power on, the flow advances to step S1, and the overall circuits of the copying machine are initialized so as to set a copying magnification at 100%, as well as to update magnifications displayed on displays 86 and 87 to read 100%. It is checked in step S2 if specific magnification keys 79 to 83 are depressed. If YES in step S2, the flow advances to step S3. In step S3, motors 56 and 61 are stopped from driving, and the flow advances to step S4. If motors 56 and 61 are not driving in step S3, the flow jumps to step S4. In step S4, the display contents of displays 86 and 87 are updated to the magnifications corresponding to the specific depressed magnification keys, and the flow advances to step S5. It is checked in step S5 if mirrors 16 and 17 (i.e., second carriage 42) and lens 18 are at their optimal positions. If NO in step S5, the flow advances to step S6. In step S6, motors 56 and 61 are driven so as to start movement of mirrors 16 and 17 and lens 18, and the flow then advances to S7. However, if NO in step S2, the flow jumps to step S7. It is checked in step S7 if mirrors 16 and 17 and lens 18 are moved to positions so that the optical path length ratio corresponds to the preset lateral magnification. If mirrors 16 and 17 or lens 18 has reached the position corresponding to the lateral magnification, the flow advances to step S8. It is checked in step S8 if lens 18 has reached the position corresponding to the lateral magnification, and if YES in step S8, the flow advances to step S9. In step S9, motor 61 is stopped from driving, and the flow advances to step S11. If NO in step S8, it is determined that mirrors 16 and 17 have reached the positions corresponding to the lateral magnification, and the flow advances to step S10. In step S10, motor 56 is stopped from driving, and the flow advances to step S11.

If YES in step S5, the flow jumps to step S11.

It is checked in step S11 if magnification up and down keys 84 and 85 are simultaneously depressed. If YES in step S11, since it cannot be determined which processing is to be performed, the flow returns to step S2, and the same operation is repeated. If NO in step S11, the flow advances to step S12, and it is checked if key 84 is depressed. If YES in step S12, the flow advances to step S13 for checking if the longitudinal magnification displayed on display 86 is at its upper limit of the positive unidirectional magnification (in this embodiment, since the magnification can be varied within the range of 100%±5%, the upper limit is 105%). If YES in step S13, since the magnification cannot be any higher, the flow returns to step S2, and if NO in step S13, the flow advances to step S16. If NO in step S12, however, the flow advances to step S14 where it is checked if key 85 is depressed. If YES in step S14, the flow advances to step S15. It is checked in step S15 if the longitudinal magnification displayed on display 86 is at its lower limit of the negative unidirectional magnification (in this embodiment, since the magnification can be varied within the range of 100%±5%, the lower limit is 95%). If YES in step S15, since the magnification cannot be any lower, the flow returns to step S2. If NO in step S15, however, the flow advances to step S16, and the display content on display 86 is updated (in this embodiment, +1% when key 84 is depressed, or −1% when key 85 is depressed), and flow then returns to step S2.

Meanwhile, if NO in step S14, the flow advances to step S17. It is checked in step S17 if motor 61 is driving, and if YES in step S17, the flow returns to step S2. Otherwise, the flow advances to step S18. It is checked in step S18 if key 73 is depressed, and if NO in step S18, the flow returns to step S2. If YES in step S18, the flow advances to step S19, and the magnifications displayed on displays 86 and 87 are stored in a magnification memory included in main control unit 91, and the flow then advances to step S20. In step S20, copying processing is started, so that motors 43, 64, and the like are driven to optically scan original O on table 12, thus forming a latent image on drum 20, as previously described. In this case, the longitudinal magnification is determined by the ratio (speed ratio) of moving speed of first carriage 41, supporting lamp 14 and mirror 15, to the rotational speed of drum 20. Therefore, when motor 43 is rotated to obtain the rotational speed corresponding to the longitudinal magnification in the magnification memory, the speed ratio can be set to correspond to the longitudinal magnification. In this way, when the copying processing is completed, the flow returns to step S2, thus preparing for the next copying operation.

Thus, a unidirectional magnification setting means for setting a unidirectional magnification by use of up or down key 84 or 85 is provided, and a variable magnification (i.e., the speed ratio) in the scanning direction of a variable magnification means is varied in accordance with the preset content of the unidirectional magnification setting means. Thus, a copied image which is reduced or enlarged in size in only a longitudinal direction (scanning direction) of an original can be easily obtained. For example, a circular pattern of an original image can be easily modified into an elliptical pattern and vice versa. In addition, various patterns and characters can be elongated in the longitudinal or lateral direction, resulting in convenience.

In the above embodiment, a case has been described wherein an original is reduced or enlarged in the scanning direction so as to obtain a modified copy. In contrast to this, the present invention can be similarly applied to a case wherein the original is reduced or enlarged in a direction perpendicular to the scanning direction so as to obtain a modified copy. In this case, a variable magnification (i.e., the optical path length ratio) in the direction perpendicular to the original scanning direction of the variable magnification means is independently varied in accordance with the preset content of the unidirectional magnification setting means.

The speed ratio is changed by varying the original scanning speed while keeping the rotational speed of the photosensitive drum constant, but it can be changed in a manner opposite to the above. Alternatively, the speed ratio can be changed by controlling both the original scanning speed and the rotational speed of the photosensitive drum.

The variable magnification means is not limited to the arrangement shown in the above embodiment, but can also be a zoom lens. In this case, when a focal length of the zoom lens is varied, the variable magnification in the original scanning direction can be changed.

Although a copying machine has been described, the present invention is not limited to this. The present invention can be applied to any image forming apparatus wherein an original is optically scanned so as to obtain an optical image, and the optical image is exposed on a photosensitive body which moves in synchronism with the original scanning operation through a variable magnification means, in which both variable magnifications in the original scanning direction and the direction perpendicular thereto can be varied in accordance with a preset image forming magnification, thereby forming an image of a desired size with respect to that of the original.

According to the present invention as described above, an image forming apparatus with good operability in which an original can be reduced or enlarged in one direction so as to obtain a modified copy without changing lenses can be provided.

What is claimed is:

1. An image forming apparatus with a unidirectional magnification function, said apparatus comprising:

original scanning means for optically scanning an original in a predetermined direction so as to obtain an optical image;

variable magnification means having first and second variable magnification mechanisms which vary magnifications of the optical image obtained by said original scanning means in the original scanning direction, and in a direction perpendicular thereto;

a photosensitive body which is movable in synchronism with said original scanning means;

image forming means for exposing the optical image onto said photosensitive body through said first or second variable magnification mechanisms of said variable magnification means so as to form an image which has the predetermined magnifications with respect to the original; and unidirectional magnification means for independently driving one of said first and second variable magnification mechanisms of said variable magnification means.

2. An apparatus according to claim 1, wherein said unidirectional magnification means comprises unidirectional magnification setting means for setting the unidirectional magnification, and control means for independently varying one of said first and second variable magnification mechanisms in accordance with the preset content of said unidirectional magnification setting means.

3. An apparatus according to claim 2, wherein the unidirectional magnification can be varied by said unidirectional magnification setting means within a predetermined range based on a reference magnification.

4. An apparatus according to claim 3, wherein the reference magnification is 100% (equal magnification).

* * * * *